(12) United States Patent
Popp et al.

(10) Patent No.: US 6,745,455 B2
(45) Date of Patent: Jun. 8, 2004

(54) AUTOMATIC MILLING AND DRILLING MACHINE

(75) Inventors: Konrad Joseph Popp, Augsburg (DE); Robert Merk, Lamerdingen (DE)

(73) Assignee: EMAG Maschinenfabrik GmbH, Salach (DE)

( * ) Notice: Subject to any disclaimer, the term of this patent is extended or adjusted under 35 U.S.C. 154(b) by 0 days.

(21) Appl. No.: 10/231,408

(22) Filed: Aug. 29, 2002

(65) Prior Publication Data

US 2003/0050160 A1 Mar. 13, 2003

(30) Foreign Application Priority Data

Sep. 11, 2001 (DE) .......................................... 101 44 678

(51) Int. Cl.[7] .............................................. B23Q 37/00
(52) U.S. Cl. ........................... 29/563; 29/564; 409/137; 409/164; 483/36
(58) Field of Search ......................... 29/563, 564, 33 P; 82/159; 409/137, 164; 483/36, 38, 50, 51, 14, 30

(56) References Cited

U.S. PATENT DOCUMENTS

| | | | | |
|---|---|---|---|---|
| 4,356,620 A | * | 11/1982 | Babel et al. ................... | 483/59 |
| 4,575,918 A | * | 3/1986 | Mattson .......................... | 483/1 |
| 4,951,376 A | * | 8/1990 | Grund .......................... | 483/14 |
| 5,242,360 A | * | 9/1993 | Bayer ........................... | 483/36 |
| 5,277,689 A | * | 1/1994 | Ruetschle et al. ............. | 483/36 |
| 5,439,431 A | * | 8/1995 | Hessbruggen et al. ........ | 483/14 |
| 5,486,151 A | * | 1/1996 | Bergmann et al. .............. | 483/1 |
| 5,781,983 A | | 7/1998 | Gruner | |
| 5,908,374 A | * | 6/1999 | Kato ............................ | 483/42 |
| 6,066,078 A | * | 5/2000 | Koelblin et al. .............. | 483/55 |
| 6,190,294 B1 | * | 2/2001 | Okada et al. ................. | 483/30 |

* cited by examiner

*Primary Examiner*—A. L. Wellington
*Assistant Examiner*—Dana Ross
(74) *Attorney, Agent, or Firm*—Herbert Dubno; Andrew Wilford

(57) ABSTRACT

A machining apparatus has a lower housing part, an upper housing part having a lower side, and a plurality of support posts fixed to the upper and lower parts and holding the upper part fixedly at a spacing above the lower part. A tool holder displaceable parallel to a horizontal tool axis on the lower side of the upper housing part carries a chuck rotatable about the tool axis and can hold a machining tool. A supply station on the lower part offset horizontally perpendicular to the tool axis from the tool holder is can hold a plurality of the workpieces. A cross slide connected between the upper housing part and a workpiece chuck displaces the workpiece chuck in a horizontal direction perpendicular to the tool axis and in a vertical direction to displace a workpiece between the station and a position aligned on the tool axis with the tool chuck.

10 Claims, 1 Drawing Sheet

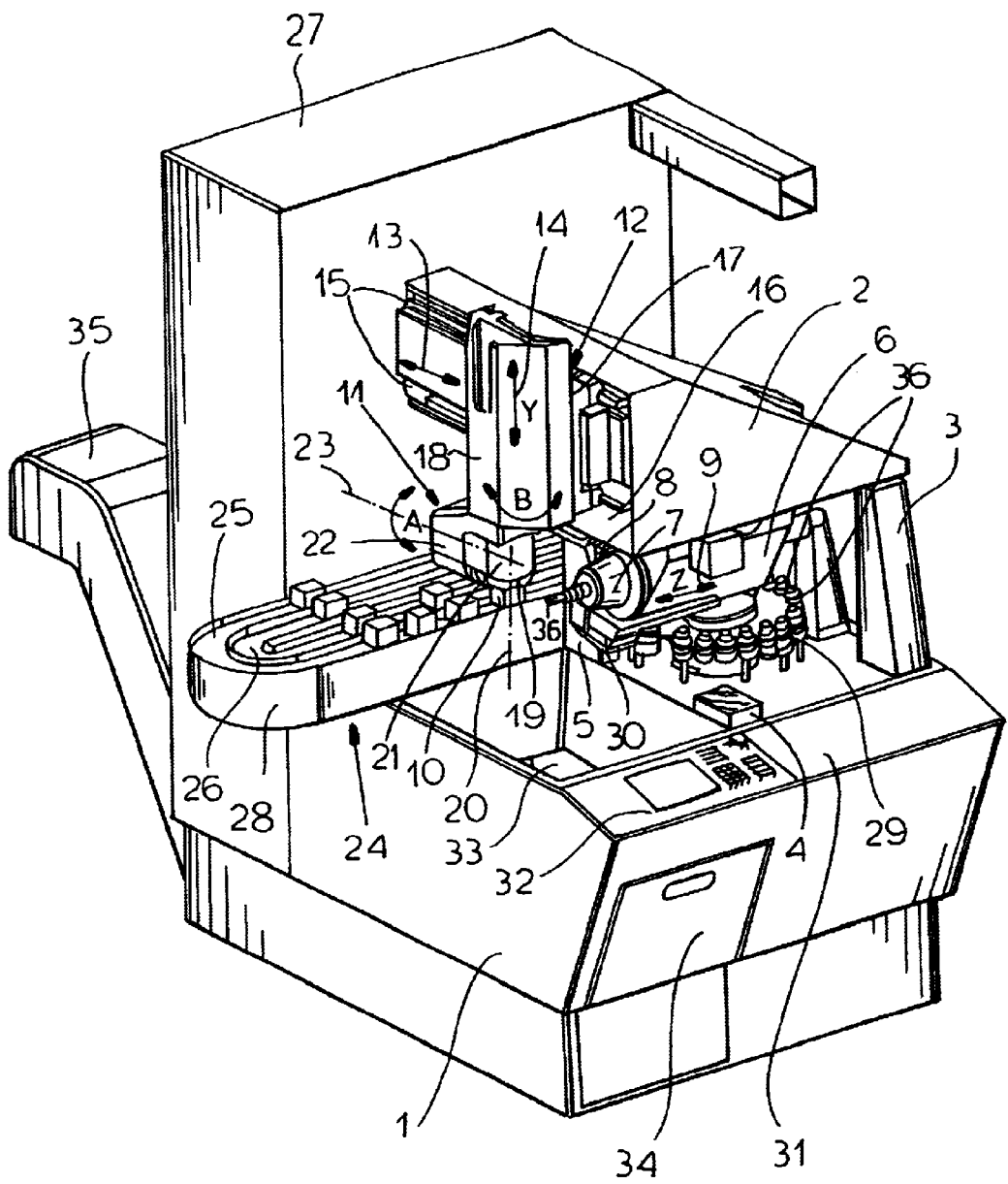

AUTOMATIC MILLING AND DRILLING MACHINE

FIELD OF THE INVENTION

The present invention relates to an automatic milling and drilling machine.

BACKGROUND OF THE INVENTION

An automatic machining apparatus, for instance for milling and/or boring a workpiece, has as described in U.S. Pat. No. 5,781,983 of Gruner at least one work unit with a rotary tool for machining a workpiece held in a machining zone. The workpiece is secured to a workpiece holder that has a workpiece chuck. The chuck can be moved into a workpiece change station where it can be switched with another workpiece. To change workpieces, a workpiece is picked up and put down from above by the holding device. For machining the workpiece is held from above by the workpiece carrier.

Such an arrangement is relatively effective, but somewhat bulky. In addition the path of movement of the workpiece is somewhat complex.

OBJECTS OF THE INVENTION

It is therefore an object of the present invention to provide an improved automatic machining apparatus.

Another object is the provision of such an improved automatic machining apparatus which overcomes the above-given disadvantages, that is which is of simple construction, which has a particularly simple and rational system for displacing the workpieces, and which achieves a high production efficiency.

SUMMARY OF THE INVENTION

These objects are achieved according to the invention in a machining apparatus having a lower housing part, an upper housing part having a lower side, and a plurality of support posts fixed to the upper and lower parts and holding the upper part fixedly at a spacing above the lower part in monoblock fashion. A tool holder displaceable parallel to a horizontal tool axis on the lower side of the upper housing part carries a chuck rotatable about the tool axis and adapted to hold a machining tool. A supply station on the lower part offset horizontally perpendicular to the tool axis from the tool holder is adapted to hold a plurality of the workpieces. A cross slide connected between the upper housing part and a workpiece chuck displaces the workpiece chuck in a horizontal direction perpendicular to the tool axis and in a vertical direction to displace a workpiece between the station and a position aligned on the tool axis with the tool chuck.

A significant advantage of the milling and boring machine according to the invention is that both the tool chuck which can rotate about and move along one axis and the workpiece chuck which can move about multiple axes are mounted on the same monoblock-style upper housing part. This ensures excellent force transmission, extreme rigidity, and accurate alignment of the chucks with each other during the machining operation. The workpiece chuck connected via the cross slide to the upper housing part not only makes the perpendicular, that is horizontal and vertical, movements necessary for machining the workpiece, but also can take care of picking up an unmachined workpiece bringing it into position for machining, and then afterward taking the machined workpiece back to the supply station for dropping off. No separate workpiece feeding system or grab is needed; the same chuck that holds the workpiece during the machining operation is the only part that touches it except the tool that machines it. The result is a streamlined work flow and high productivity. The time between succeeding machining operations can be reduced to a bare minimum.

Another substantial advantage of this invention is that, since both the chucks that handle the workpieces and the tools are mounted on the upper housing part, hanging therefrom, the chips and particles generated by the machining operation will not foul them. Instead these chips will fall down to the lower part which can be provided underneath the tool chuck with a catch basin that efficiently collects them.

According to another feature of the invention the upper housing part has a vertical surface extending above the supply station. A horizontal guide on the vertical surface and extending perpendicular to the tool axis carries the cross slide. The cross slide includes a horizontally displaceable element movable along the horizontal guide and a vertically displaceable element movable vertically on the horizontally displaceable element and carrying the workpiece chuck. The workpiece chuck is pivotal about a vertical axis on the vertically displaceable element and is pivotal about a horizontal axis transverse to the tool axis on the vertically displaceable element. Thus five-sided machining of the workpieces is possible.

The supply station includes conveyor means for horizontally transporting workpieces into and out of the supply station. Typically the conveyor is one or more belt-type conveyors that bring a unmachined workpieces into reach of the workpiece chuck and that take out machined workpieces dropped off by the workpiece chuck. The infeed and outfeed belts are immediately adjacent each other so that the workpiece chuck has only a short distance to travel after dropping off a machined workpiece to pick up an unmachined one.

Furthermore according to the invention a magazine holding a plurality of tools on the lower housing part is provided beneath the tool chuck. An automatic tool changer is provided on the upper part for taking a tool from the magazine and inserting it in the tool chuck and for taking a tool from the tool chuck and inserting it in the magazine. Thus the same tool chuck can perform different operations. The tool changer is normally a two-jaw grab.

BRIEF DESCRIPTION OF THE DRAWING

The above and other objects, features, and advantages will become more readily apparent from the following description, reference being made to the accompanying drawing whose sole FIGURE is a partly diagrammatic and perspective view of the automatic milling/boring machine according to the invention.

SPECIFIC DESCRIPTION

As seen in the drawing a multipurpose automatic machining apparatus has a lower part 1 that sits on the floor and that is fixedly secured to an upper part 2 by support posts 3, 4, and 5 (post 4 being shown cut away for clarity of view). The upper part 2 is therefore integral with and cannot move at all with respect to the lower part 1, of so-called monoblock construction.

The upper part 2 carries a holder or mount 6 holding a spindle or chuck 7 that can be moved along a horizontal Z-axis 9 on guide rails 8 on the underside of the upper part 2 by an unillustrated actuator. The chuck 7 is rotated about a horizontal axis parallel to this axis 9 by an unillustrated drive motor.

A workpiece 10 to be milled, bored, or otherwise machined by a tool 36 held in the chuck 7 is carried by another holder 11 that is supported by a cross slide 12 for movement along an X-axis 13 perpendicular to the axis 9 and along a vertical Y-axis 14 perpendicular thereto on the upper part 2. Horizontal guide rails 15 on a vertical front face 16 of the part 2 support a horizontal cross-slide element 17 movable along the axis 13 and a vertical cross-slide element 18 is supported by similar unillustrated rails on the slide 17 for movement along the axis 14. Appropriate drives and actuators are connected to the slide elements 17 and 18 to move them along the respective axes 13 and 14.

The lower end of the vertical slide element 18 carries the workpiece holder 11 which comprises a multijaw workpiece chuck 19 that can be rotated about its center B-axis 20 by a drive and that is itself mounted on a holder 21 that can also be pivoted on a part 22 of the holder 11 about an A-axis 23 parallel to the axis 13 and perpendicular to the axes 14 and 9. A harmonic drive integrated in the chuck 19 and holder 21 can serve to turn these elements.

A workpiece supply station or feeder 24 is provided on the lower part 1 offset below and to one side of the chuck 7 so that the workpiece chuck 19 can move between it and the chuck 7. More particularly, this feeder 24 has a pair of separate transport belts 25 and 26 that follow arcuate paths projecting out of the apparatus at a projection outer feeder part 28 between the chuck 7 and a cabinet 27 carried on the ends of the parts 1 and 2. The outer feeder part 28 projects in fact through an unillustrated jacket that normally encloses the moving parts of the machine. The belts 25 and 26 transport unfinished workpieces 10 into the machine and finished workpieces 10 out of it. The projecting part 28 of the feeder 24 can be loaded and unloaded manually or by automatic equipment.

A carousel-type magazine 29 for the tools 36 is provided underneath the spindle holder 6 and a tool changer 30 carried on the mount 6 having a pair of grab jaws can pick them out of this magazine 29 and fit them to the chuck 7. The changer 30 can also pivot about an axis offset by 45° to the axis 9 to pick a tool 36 out of the chuck 7 and place it in the magazine 29. Like all the other functions, the operation of this changer 30 is controlled at a console 31 on one side of the base 1 and having a display and keyboard 32 for inputting the program that controls all the various actuators and drives.

Underneath the workstation where the actual tools 36 carried in the chuck 7 work on the workpieces 10 carried by the chuck 19 is a well 33 for catching particles generated by the machining operation. A drawer 34 on the side of the machine and/or an automatic output feeder 35 can serve for eliminating or carrying off the caught chips and turnings.

We claim:

1. A machining apparatus comprising:
   a lower part;
   an upper part having a lower side directed downward toward the lower part;
   a plurality of support posts fixed to the upper part and to the lower parts and holding the upper part fixedly at a spacing above the lower part;
   a tool holder mounted on the lower side of the upper housing part so as to be displaceable parallel to a horizontal tool axis;
   a chuck carried on the tool holder, rotatable about the tool axis, and adapted to hold a machining tool;
   a supply station on the lower part offset horizontally perpendicular to the tool axis from the tool holder and adapted to hold a workpiece;
   a workpiece chuck; and
   means including a cross slide mounted and movable on the upper part and carrying the workpiece chuck for displacement of the workpiece chuck in a horizontal direction perpendicular to the tool axis and in a vertical direction for displacing a workpiece between the supply station and a position aligned on the tool axis with the tool chuck.

2. The machining apparatus defined in claim 1 wherein the upper part has a vertical surface extending above the supply station, the apparatus further comprising
   a horizontal guide on the vertical surface, extending perpendicular to the tool axis, and carrying the cross slide.

3. The machining apparatus defined in claim 2 wherein the cross slide includes a horizontally displaceable element movable along the horizontal guide and a vertically displaceable element movable vertically on the horizontally displaceable element and carrying the workpiece chuck.

4. The machining apparatus defined in claim 3 wherein the workpiece chuck is pivotal about a vertical axis on the vertically displaceable element.

5. The machining apparatus defined in claim 3 wherein the workpiece chuck is pivotal about a horizontal axis transverse to the tool axis on the vertically displaceable element.

6. The machining apparatus defined in claim 1 wherein the supply station includes conveyor means for horizontally transporting workpieces into and out of the supply station.

7. The machining apparatus defined in claim 1, further comprising
   a magazine holding a plurality of tools on the lower part beneath the tool chuck.

8. The machining apparatus defined in claim 7, further comprising
   means on one of the parts for taking a tool from the magazine and inserting it in the tool chuck and for taking a tool from the tool chuck and inserting it in the magazine.

9. The machining apparatus defined in claim 8 wherein the one part is the upper part.

10. The machining apparatus defined in claim 8 wherein the means for taking includes a two-jaw grab.

* * * * *